May 24, 1938.    J. E. JOHNSON    2,118,309
BARLEY POLISHER OR PEARLER
Filed June 20, 1936
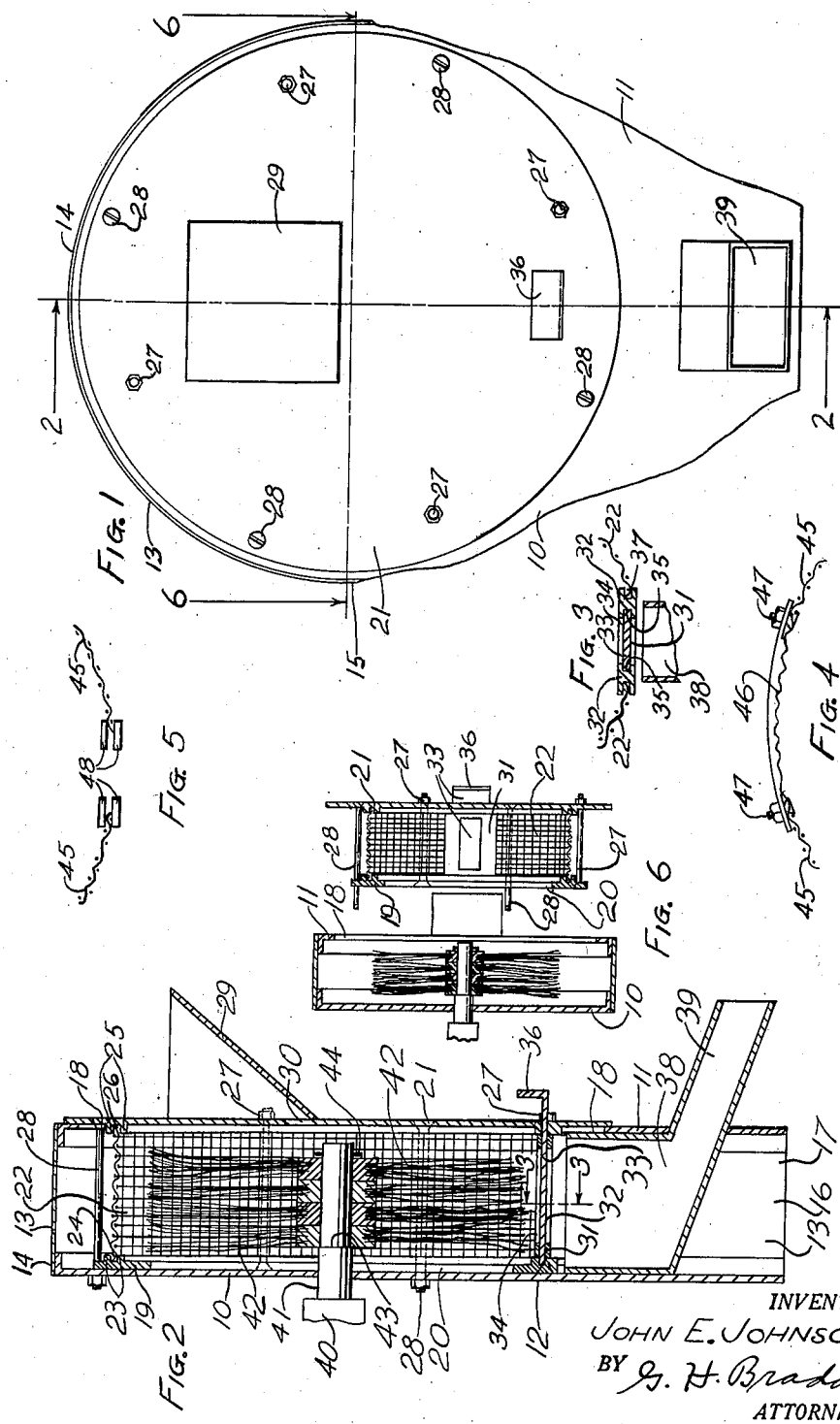
INVENTOR.
JOHN E. JOHNSON
BY G. H. Braddock
ATTORNEY Patented May 24, 1938

2,118,309

UNITED STATES PATENT OFFICE 2,118,309

BARLEY POLISHER OR PEARLER

John E. Johnson, Atwater, Minn.

Application June 20, 1936, Serial No. 86,335

1 Claim. (Cl. 83—30)

This invention relates to a machine for removing husks, fuzz, beard, dirt, etc., from grain, seed, or the like. As disclosed, the machine is more especially adapted to the purpose of polishing, pearling or brushing barley.

An object of the invention is to provide a machine of the present character wherein will be incorporated various improved features and characteristics of construction novel both as individual entities of the machine and in combination with each other.

A further object is to provide a machine for brushing husks, fuzz, beard, dirt, etc., from quantities of grain or seed for use as demonstrating samples of the grain or seed which will properly prepare the samples in less time than has heretofore been required and without grinding away or rubbing off any of the substance of the grain or seed berries.

And a further object is to provide a barley polisher or pearler which will brush the hulls, etc., off of grains of barley to be employed for sample purposes in a minimum of time and will leave the berry of the barley whole and unmutilated.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claim which follows.

In the accompanying drawing forming a part of this specification,

Fig. 1 is a front elevational view, partially broken away, of a machine in which the features of the invention are incorporated;

Fig. 2 is a vertical central sectional view, taken on line 2—2 in Fig. 1;

Fig. 3 is a detail sectional view, taken as on line 3—3 in Fig. 2;

Figs. 4 and 5 are detail views of a portion of a modified type of screening structure which can be employed in the machine, Fig. 4 disclosing a sinuous or corrugated plate of said screening structure detachably secured to separate pieces of screen, and Fig. 5 disclosing spaced apart guides on said separate pieces of screen for a gate or slide covering the discharge outlet of said machine.

Fig. 6 is a non-assembled reduced sectional view, taken about on line 6—6 in Fig. 1, disclosing the screen and cover plate disassembled from the casing and in alinement for assembling.

The disclosure as herein made is of a machine for taking the husks, etc., off of "sample" barley so that experts can tell the grade of the barley. It will be obvious that the machine can be employed for polishing, pearling, brushing, scouring, cleaning, etc., grain, seed, and the like, of various kinds.

With respect to the drawing and the numerals of reference thereon, 10 denotes a housing constituting a frame for the machine. Said housing or frame 10 as shown consists of spaced apart, vertical, parallel front and rear walls, represented 11 and 12, respectively, and a continuous member 13 integrally connecting the front and rear walls. The member 13 constitutes the top wall 14 and the side walls 15, 15 of the housing or frame 10. The top wall 14 is of curvilinear or arc shape in the direction of its length, and merges into the side walls 15, 15 at its lower extremities. Said side walls 15, 15 flare outwardly and downwardly from said top wall 14, and the upper edges of the front and rear walls meet the side edges of the top and side walls. Each side wall 15, 15 includes a lower upright part 16 at its lower portion, and the side edges of the front and rear walls meet the side edges of said upright parts 16. The top wall 14 and the side walls 15 and their upright parts 16 are perpendicular to the front and rear walls 11 and 12, and the lower edges of said front and rear walls and said upright parts 16 terminate in a single plane which is desirably perpendicular to the front and rear walls. The housing or frame 10 can be supported in any convenient manner, as, for example, upon the lower edges of the front and rear walls 11 and 12 thereof. As disclosed the lower portion of said housing or frame is open, as indicated at 17.

A screening structure of the machine is removably received by the housing or frame 10 through an opening 18 in the front wall 11. As shown, the opening 18 is circular.

The screening structure includes an annular plate 19 with circular opening 20, a circular cover plate 21 spaced from and parallel with the plate 19, and a cylindrical screen 22. The diameter of the annular plate 19 is smaller than the diameter of the circular opening 18, and the diameter of the circular cover plate 21 is greater than the diameter of said circular opening 18.

The annular plate 19 includes circular, spaced apart bosses or ridges 23 upon its inner side providing a circular recess 24 receiving one edge portion of the cylindrical screen 22, and the circular cover plate 21 includes circular, spaced apart bosses or ridges 25 upon its inner side providing a circular recess 26 receiving the opposite edge portion of said cylindrical screen. Headed and nutted bolts 27 extend through the annular plate 19 and the circular cover plate 21 and clamp said plates 19 and 21 against the opposite side edges of the cylindrical screen 22 so that said screen is held in the recesses 24 and 26. That is to say, the bolts 27 fasten the annular plate 19, the circular cover plate 21 and the cylindrical screen 22 into a unitary construction constituting the screening structure of the machine.

The arrangement is such that when the screening structure is set into the housing or frame 10 the outer surface of the annular plate 19 engages the inner surface of the rear wall 12 and the inner surface of the marginal portion of the cover plate 21 engages the outer surface of the front wall 11, as the parts are disclosed in Fig. 1. That is, the plates 19 and 21 of the screening structure are spaced apart a distance substantially equal to the distance between the rear wall 12 and the front wall 11 of the housing or frame 10.

The screening structure is rigidly held in said housing or frame 10 by headed and nutted bolts 28 which extend through the circular cover plate 21 and the rear wall 12. The bolts 28 are spaced inwardly of the cover plate 21 at sufficient distance to clear the surrounding wall of the circular opening 18 and are located outwardly of said cover plate at sufficient distance to clear the outer margin of the annular plate 19. That is, the bolts 28 are within the circumference of the opening 18 and without the circumference of the annular plate 19, and, naturally, at the outer side of the cylindrical screen 22, in spaced relation to said screen.

In order that the annular plate 19 will fit nicely up against the rear wall 12, the heads of the bolts 27 are desirably countersunk into said annular plate 19 and the fastening nuts for said bolts 27 are turned up against the cover plate 21. Also, as shown the heads of the bolts 28 are countersunk into the cover plate 21 and the fastening nuts for said bolts 28 are turned up against the rear wall 12.

It will be evident that the screening structure is insertable into and removable from the housing or frame 10 as a unit, and that said screening structure, generally speaking, consists of detachably connected elements 19, 22, and 21.

The cover plate 21 integrally supports a hopper 29 which leads to an aperture 30 through said cover plate affording communication between the hopper and the interior of the cylindrical screen 22.

A lower portion of said cylindrical screen 22 is cut away to provide an outlet from the screening structure. As disclosed, the cut-away portion of the cylindrical screen receives a member 31 providing guides 32 for a gate or slide 33 removably covering a discharge outlet 34 from the interior of said cylindrical screen. The guides 32 of the member 31 include spaced apart guide ways 35 facing each other in which the gate or slide 33 is slidably movable. Said gate or slide 33 includes a finger piece 36 at the front of the machine, the gate or slide itself passing through a slot in the cover plate 21. When the finger piece 36 is pushed inwardly, the discharge outlet 34 is caused to be closed, and when said finger piece is pulled outwardly, the outlet 34 is opened. The member 31 also includes recesses 37 at its opposite side edges which rigidly receive adjacent portions of the cylindrical screen 22. In addition to being securely connected to the cylindrical screen 22 the member 31 is clamped between the annular plate 19 and the cover plate 21, the opposite side edge portions of said member 31 being engaged with the bosses or ridges 23 and 25 as best disclosed in Fig. 1.

A chute 38 is suitably secured in the open bottom portion 17 of the housing or frame 10 directly beneath the discharge outlet 34, and said chute 38 includes an angularly disposed, downwardly and forwardly extending passageway 39 projecting through the front wall 11 and terminating at location forwardly of said housing or frame. The chute 38 may be of any preferred construction and may be attached to the housing or frame in any desired manner. Conveniently, said chute will be of structure and will be related to the discharge outlet 34 in a manner to insure that all material which passes downwardly through said discharge outlet will enter the chute and its passageway 39.

An electric motor 40 is conveniently supported in any ordinary or preferred manner (not shown) adjacent to the rear wall 12 of the housing or frame 10, and the shaft 41 of said motor extends through said rear wall and into the interior of said housing or frame. Said shaft 41 is located concentrically of the cylindrical screen 22 when the screening structure is supported or mounted in the housing or frame 10, in the manner as before set forth.

The shaft 41 carries a series of brushes 42, which may desirably be of wire and which extend radially and terminate in slightly spaced relation to the cylindrical screen 22. The brushes 42 terminate in a circumference concentric with said cylindrical screen. Said brushes 42 can be located upon the shaft 41 to rotate therewith in any convenient manner. As disclosed, the shaft 41 includes a reduced portion at its outer end receiving the brushes and providing a shoulder 43 adjacent the inner end of the reduced portion, and the brushes are fixed upon the shaft between said shoulder 43 and a transverse pin 44 in said shaft.

In practice, with the gate or slide 33 in the closed position of the discharge outlet 34 the barley, grain, seed, or the like, to be polished, pearled, brushed, or otherwise operated upon, is dropped into the hopper 29 and enters the interior of the screening structure. That is, the material enters the interior of the cylindrical screen 22 by way of the aperture 30. Upon operation of the motor 40 and consequent rotation of the motor shaft 41 and the brushes 42, said brushes cause the barley, grain, seed, or the like, to be operated upon by cooperation between the brushes and the cylindrical screen in a manner which will be evident, and the resultant rubbing and/or brushing action upon the material will remove the husks, hulls, fuzz, beard, dirt, etc., from the material. The removed chaff and/or refuse will be thrown through the screen 22. Upon stopping the motor 40, the polished, pearled or brushed material will locate itself in the bottom of the screening structure, and when the finger piece 36 is pulled forwardly, said material will drop through the chute 38 and its passageway 39, where the material may be caught in the hand, or in any container.

When the machine is employed to prepare samples of grain, a small quantity only of the grain will be operated upon in the machine.

By experiment and experience, the present machine will cause barley to be prepared for sample purposes in less time than will other machines of which I am aware and will prepare true samples of barley, unmutilated and whole. The present machine brings out the sample without grinding away the ends of the berries and without removing any consequential part of the germ.

In Figs. 4 and 5 there is disclosed a portion of a modified type of screening structure which can be employed in the machine. Instead of being made as a single entity, the screen 45 of Figs. 4 and 5 is made in two pieces. In Fig. 4, a sinuous or corrugated plate 46 is shown removably attaching the separate screen pieces to each other, as by employment of small headed and nutted bolts 47, and in Fig. 5, spaced apart guides 48 suitably secured to the screen pieces are for carrying a gate or slide such as 33. The sinuous or corrugated plate 46 will be at the top of the screening structure when the construction as in Figs. 4 and 5 is employed, and the guides 48 for the gate or slide covering the discharge outlet will of course be at the bottom of said screening structure. The elements of Figs. 4 and 5 may be clamped in the screening structure between plates, such as 19 and 21, thereof in the manner as already described.

The construction as in Figs. 4 and 5 will function in the machine in substantially the same manner as before set forth, the only difference being that material, grain, seed, etc., which is carried to the location of the sinuous or corrugated plate 46 will be rubbed and/or brushed by cooperation between said plate and the brushes 42. The plate 46 is of course arc shape in the direction of the circumference of the screen to in cooperation with the screen pieces constitute a complete abrading circumference.

The outer ends of the brushes 42 are in a circumference desirably not much greater than the circumference of the circular opening 20 in the annular plate 19, so that when the bolts 28 are released, the screening structure including said annular plate 19, the cylindrical screen 22 and the cover plate 21 can be readily removed from the housing or frame 10 clear of said brushes 42 while the brushes remain upon the motor shaft 41. With the screening structure removed from said housing or frame and from the brushes, all of the parts of the machine are conveniently accessible for cleaning, as will be obvious.

It will be seen that when the parts of the machine are in their assembled relationship, as in the drawing, there is no possibility of the material operated upon accidentally leaving the screening structure, although husks, hulls, chaff, etc., can pass outwardly through the screen apertures. Said apertures will of course be sufficiently small to preclude passage therethrough of the berries. There will be no tendency for passage of berries or chaff upwardly or outwardly through the aperture 30. The only possible exit for the berries, or other material prepared, is the discharge outlet 34.

The aperture 30 is so located that upon rotation of the brushes 42 air is sucked into the screening structure through said aperture due to centrifugal force created by rotation of said brushes. The centrifugal force causes the husks, hulls, chaff, dirt, etc., to be driven from within the cylindrical screen 22 outwardly through said screen, and, also, has tendency to keep the brushes 42 clean.

The open lower end of the housing or frame 10 may be supported upon and open into an otherwise closed cabinet (not shown), with a closed connection provided between said housing or frame and said cabinet so that husks, hulls, chaff, dirt, etc., driven through the cylindrical screen 22 will have no outlet to atmosphere. Upon passing the screen, the refuse will fall into the cabinet.

What is claimed is:

A machine of the character described, comprising a housing including spaced apart front and rear walls and top and side walls interconnecting said front and rear walls, an opening in the front wall, a screening structure within said housing and including a removable cover-plate for said front wall, a cylindrical screen and means mounting said screen solely upon the cover plate, the screening structure being adapted to be inserted into said housing through the opening in said front wall and the opening being closed by said cover plate, a shaft rotatably mounted within said cylindrical screen, said shaft being independent of and out of the path of movement of said cover plate, brushes fixed upon the shaft for rotation therewith and within the screen, said brushes terminating adjacent to said screen, an inlet to the interior of the screen adjacent to said shaft, an outlet through the screen at a lower portion thereof, and manually adjustable means covering said outlet.

JOHN E. JOHNSON.